(12) United States Patent
Sugimoto et al.

(10) Patent No.: US 7,161,085 B2
(45) Date of Patent: Jan. 9, 2007

(54) THIN FLAT TWISTED-PAIR GAP CABLE AND GAP NAVIGATOR UNIT

(75) Inventors: Keiichiro Sugimoto, Kanagawa (JP); Yasuhiro Hatakeyama, Kanagawa (JP); Yasuhiro Toriyama, Tokyo (JP); Kouji Fukushima, Tokyo (JP); Masahiro Izaki, Saitama (JP); Noriaki Tanaka, Gunma (JP)

(73) Assignees: Nippon Telegraph and Telephone Corporation, Tokyo (JP); Japan Radio Co., Ltd., Tokyo (JP); Oki Electric Cable Co., Ltd., Kawasaki (JP)

( * ) Notice: Subject to any disclaimer, the term of this patent is extended or adjusted under 35 U.S.C. 154(b) by 0 days.

(21) Appl. No.: 11/170,078

(22) Filed: Jun. 30, 2005

(65) Prior Publication Data

US 2006/0011375 A1 Jan. 19, 2006

(30) Foreign Application Priority Data

Jun. 30, 2004 (JP) ............................. 2004-193075

(51) Int. Cl.
*H01B 7/08* (2006.01)
(52) U.S. Cl. .................................. 174/117 F
(58) Field of Classification Search ............ 174/117 F, 174/27
See application file for complete search history.

(56) References Cited

U.S. PATENT DOCUMENTS 3,833,755 A * 9/1974 Soelberg ................. 174/117 F
4,468,089 A * 8/1984 Brorein ....................... 385/114
4,636,024 A * 1/1987 Yahata ........................ 439/449
6,440,569 B1* 8/2002 Kanamori et al. ........... 428/429
2002/0062981 A1* 5/2002 Nuyten et al. ............ 174/117 F
2004/0206543 A1* 10/2004 Chuo et al. ............... 174/117 F

FOREIGN PATENT DOCUMENTS

JP 09-050715 2/1997

* cited by examiner

Primary Examiner—Chau N. Nguyen
(74) Attorney, Agent, or Firm—Staas & Halsey LLP

(57) ABSTRACT

A thin flat twisted-pair gap cable and gap navigator unit reduces the diameter of twisted-pair wire, aligns them side by side, and fuses and fixes them in place with two plies of tape so as to flatten the conventional round twisted-pair cable in order to pass the conventional round twisted-pair cable used for high-speed transmission through a gap in a window sash or the like. Two core wires each consisting of a small-diameter conductor covered with an insulating covering of PE or the like are twisted together evenly to make the twisted-pair wires, with the necessary number of twisted-pair wires aligned side by side. The insides of two plies of plastic tape are coated with a thermoplastic adhesive and the aforementioned cable is inserted into and sandwiched between the two plies of plastic tape and the tape fused together so that the twisted-pair wires aligned side by side come in the middle of the width of the tape to form a flattened gap cable. Adhesive tape, with the adhesive surface facing out is provided on one side of this flat cable to enable the cable to be stuck to the surface of the gap in the sash of the window.

20 Claims, 3 Drawing Sheets

THIN FLAT TWISTED-PAIR GAP CABLE AND GAP NAVIGATOR UNIT

BACKGROUND OF THE INVENTION

1. Field of the Invention

The present invention relates to a thin flat twisted-pair cable capable of high-speed transmission put into and passed through a gap portion of a sash for a window in a house or the like, and a gap navigator unit therefor.

2. Description of Related Art

As shown in FIG. 2, a twisted-pair cable for high-speed transmission typified by a conventional LAN cable is a round cable composed of two core wires each consisting of PE insulator over a 0.5 mmφ conductor twisted together to form a pair of twisted wires, with four of these pairs of twisted wires further twisted together and covered with a sheath. The outer diameter of this round cable is a thick 5–6 mm, and therefore a hole is drilled in the wall when the cable is led into the interior of a house (see, for example, JP 9-50715A).

SUMMARY OF THE INVENTION

The present invention, in order to pass a twisted-pair cable for high-speed transmission trough the gap in a window sash or the like with ease, provides a high-performance flat cable with a thickness of 2 mm or less. Further, since the portion of the cable that passes through the gap is at most a short 20–30 cm in length, by using a small-diameter twisted-pair construction that satisfies all performance requirements other than attenuation performance, coating one side of each of two plies of plastic tape resistant to ultraviolet rays with a thermoplastic adhesive and disposing the two plies of tape so that their coated surfaces are disposed opposite each other, with the required number of small-diameter twisted-pair wires inserted therebetween, and fusing the two plies of plastic tape together to securely fix the twisted-pair wires in place, the present invention can provide a high-performance thin flat cable. Furthermore, to protect the twisted-pair wire from the pressure of impact upon opening and closing the window, the present invention provides a construction in which the thickness of adhesive tape stuck to both edges of the flat cable is greater than the outer diameter of the twisted-pair wire, or a core wire or a spacer that is thicker than the outer diameter of the twisted-pair wire is inserted.

The thin flat twisted-pair cable of the present invention, despite being limited to short distances, provides high-speed transmission performance, and moreover, enables the twisted-pair cable to be installed securely over the uneven surface of the window sash with ease, can withstand opening and closing of the window, and can be used outdoors, allowing the twisted-pair cable to be led into the interior of the house without the need to open a hole in the wall of the house to do so. This superb advantage means that the industrial value of the invention is correspondingly great.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 1a–c are cross-sectional views of the thin flat twisted-pair gap cables of the present invention, in which FIG. 1a is a cross-sectional view of thin flat twisted-pair gap cables 1A, 1B according to first and second embodiments of the present invention, respectively, FIGS. 1b and 1c are cross-sectional views of thin flat twisted-pair gap cables 1C, 1D, respectively according to a fourth embodiment of the present invention.

DETAILED DESCRIPTION

A detailed description will now be given of embodiments of a thin flat twisted-pair gap cable 1 and a gap navigator unit 9 of the present invention with reference to the accompanying drawings.

Figure 1A:
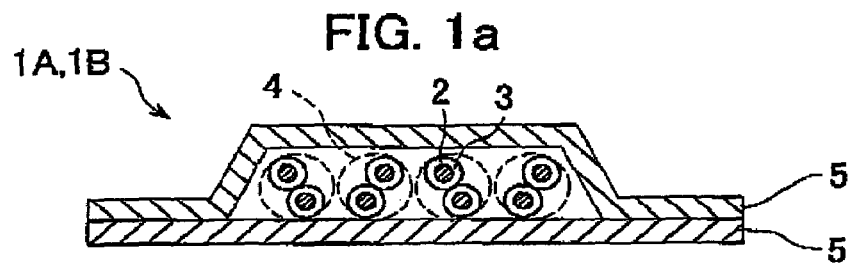

First, in order to give a thin flat twisted-pair gap cable 1A of a first embodiment of the present invention both thinness and high-speed transmission performance, as shown in FIG. 1a, an insulated core wire is formed by covering a conductor 2 having a conductor diameter of 0.4 mm or less with a PE or PP insulator 3 having an outer diameter of 0.8 mm or less, and twisting together equally two such insulated core wires to form a twisted-pair wire 4. So that the characteristic impedance is 100Ω as well as to satisfy crosstalk performance requirements, the construction of the insulated core wires is such that the pitch of the twisted pair differs with each turn and further is set finely. Four of these twisted-pair wires are then aligned side by side in the required number (usually 2–4 wires). These twisted-pair wires 4 aligned side by side are then sandwiched between two plies of plastic tape coated on their insides with thermoplastic adhesive and inserted in the cable, and the two plies of plastic tape are fused together so that the twisted-pair wires come in the center of the two plies of plastic tape width-wise, such that the total thickness of the flattened gap cable is 2 mm or less so as to form the thin flat twisted-pair gap cable 1A.

Next, as a thin flat twisted-pair gap cable 1B of a second embodiment of the present invention, as shown in FIG. 1a, in the thin flat twisted-pair gap cable of the first embodiment, the thickness of one of the fused two plies of plastic tape is 50 μm or less and the thickness of the other ply is 100–200 μm, so that the tape of the thin flat twisted-pair gap cable 1B is of different thicknesses. Employing such a construction permits the thinner of the two plies of plastic tape to securely fix the twisted-pair wires in place in the center of the tape into which they are inserted, with the thicker of the two plies of plastic tape serving as the base. In addition, such a structure reduces the total thickness of the flat cable to 2 mm or less and enables the cable to be stuck with ease over the unevenness in the surface of a sash when the cable is put through a gap in the sash, yet has a thickness and strength adequate to withstand the impact of opening and closing of the window and door.

A thin flat twisted-pair gap cable 1C of the third embodiment of the present invention, although not shown in the diagrams, adds ultraviolet ray-proof particles to the plastic tape 5 of the first and second embodiments to protect the internal twisted-pair wires from ultraviolet rays. When sticking the thin flat gap cable in the sash, in most cases part of the cable protrudes outside, and the plastic tape used is not colorless and transparent but has particles of titanium white or the like that block out ultraviolet rays. Accordingly, the plastic tape is weather-resistant, and also water-resistant because both edges of the cable are fused together between the two plies of plastic tape.

Figure 1B:
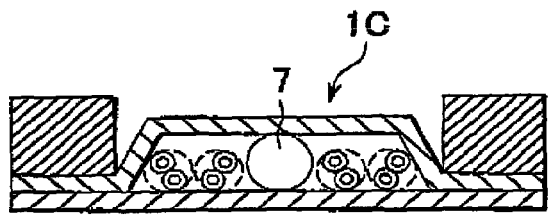
Figure 1C:
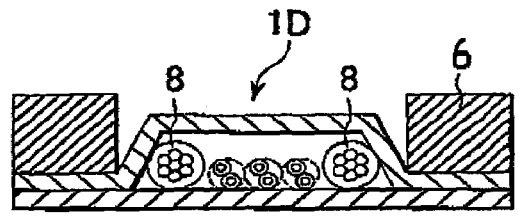

In the thin flat twisted-pair gap cable 1C and 1D of a fourth embodiment of the present invention, as shown in FIGS. 1b and 1c, in order to protect the twisted-pair wires that transmit high-speed signals from the pressure of opening and closing of the window or the door, the thickness of adhesive tape 6 stuck along both edges of the flat gap cable is equal to or greater than the convex part of the center of the cable that contains the twisted-pair wires, or a spacer 7 or insulated core wires 8 having a thickness greater than the outer diameter of the twisted-pair wires is aligned side by side with the twisted-pair wires, or a combination thereof. Although the thickness of the adhesive tape 6 may be the same as that of the flat cable, preferably the thickness of the adhesive tape is greater than that of the flat cable. Moreover, although in this embodiment a typical polyester tape is used for the plastic tape, the plastic tape is not limited thereto. Employing such a construction improves resistance to the impact of opening and closing the window or door by inserting a spacer or insulated core wires that are thicker than the outer diameter of the twisted-pair wires, and applying adhesive tape along both edge portions of the flat cable that is thicker than the outer diameter of the twisted-pair wires acts as a damper and enables the strength of the cable to be upgraded.

A thin flat twisted-pair gap cable of a fifth embodiment of the present invention, although not shown in the diagrams, conforms to the electrical performance standards for a LAN cable by employing the thin flat twisted-pair gap cable of each of the first through fourth embodiments, respectively. As specific embodiments thereof, using the examples of the first and second embodiments, a Near End Cross Talk evaluation test is shown in TABLE 2 and results of electrical performance tests other than Near End Cross Talk are shown in TABLE 3. As can be understood by these tables, the present invention conforms to electrical performance standards.

Figure 1D:
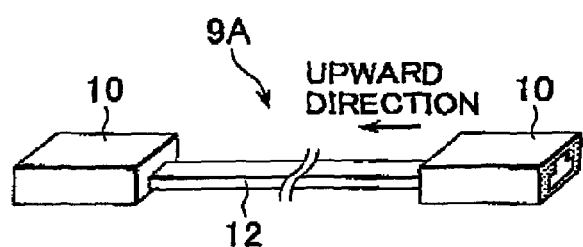
FIG. 1d is a perspective view of a gap navigator unit 9A according to a sixth embodiment of the present invention.

A gap navigator unit 9A of a six embodiment of the present invention is shown in FIG. 1d. Although an arrangement in which both ends are LAN modular rosettes 10 is shown in FIG. 1d, the invention is not limited thereto, and an arrangement may be used in which both ends may be modular plugs 11 or a combination plugs and rosettes may be employed.

A gap navigator unit according to a seventh embodiment of the present invention protects a connected device by providing a pulse transformer built into the modular rosette of the sixth embodiment A transformer is provided in the modular rosette because, in the case of a power source for supplying power that utilizes the empty pins of an Ethernet (registered trademark) cable, if the covering on the gap cable is damaged or if the cable is cut and the Ethernet (registered trademark) signal line is shorted, there is a possibility that a connected Ethernet (registered trademark) input/output device might be damaged. In order to protect such connected device from such damage, a transformer is provided in the cable. By providing a transformer in the cable, no voltage is applied to the device even if direct current is applied to the Ethernet (registered trademark) signal line, and moreover, since no current flows, the connected device can be protected without relying on the interface circuit of the connected device.

Figure 1E:
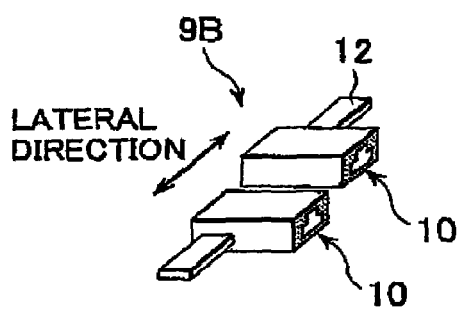
FIG. 1e is a perspective view of a gap navigator unit 9B according to an eighth embodiment the present invention.

As shown in FIG. 1e, a gap navigator unit 9B according to an eighth embodiment of the present invention is constructed so that, in the gap navigator unit of the sixth embodiment, the flat twisted-pair cable 12 can be pulled not only upward but also laterally from the modular rosette. Such a construction enables greater freedom of installation, and enables changes in the window sash or other such mounting position, as well as changes in wiring arrangement ranging from standard size to non-standard size as well as layout changes, to be accommodated flexibly.

Figure 1F:
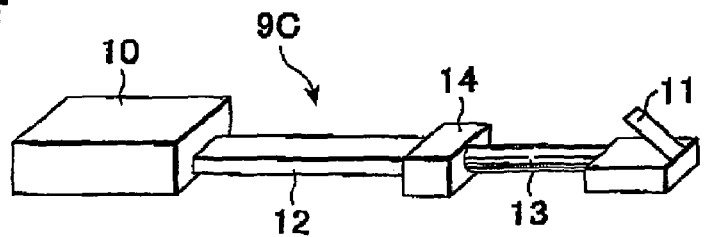
FIG. 1f is a perspective view of a gap navigator unit 9C according to a ninth embodiment the present invention.
Figure 2:
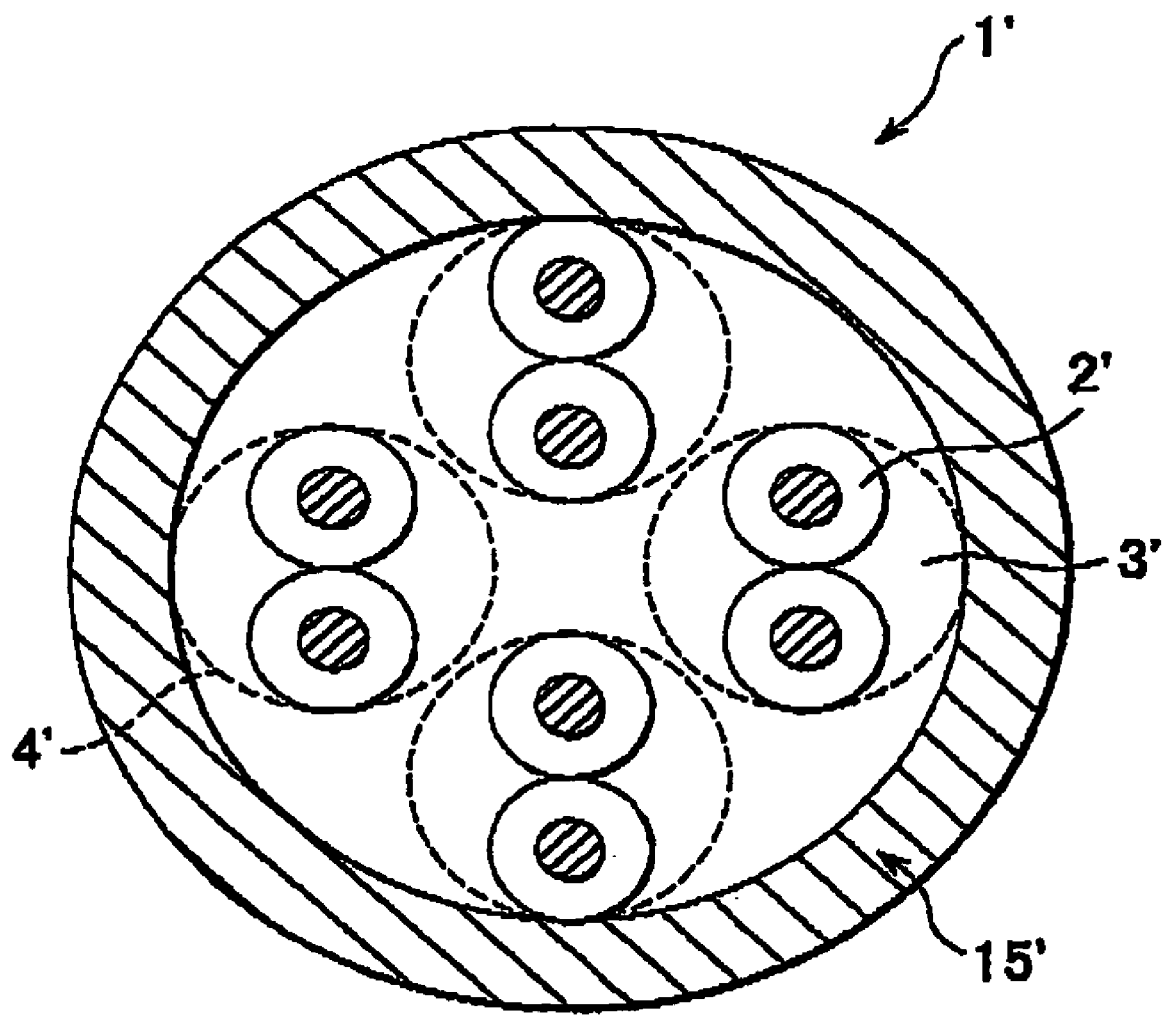
FIG. 2 is a cross-sectional view of a conventional LAN cable 1'.

As shown in FIG. 1f, a gap navigator unit 9C according to a ninth embodiment of the present invention further provides an adapter 14 for connecting to an ordinary round cable 13 in each of the thin flat twisted-pair gap cables 12 of the sixth through eighth embodiments. The adapter 14, which is composed of a heat contraction tube and a base, functions to connect the LAN cable and the flat cable.

Next, a description will be given using as an example the specific embodiment that is the thin flat twisted-pair gap cable 1D of the fourth embodiment of the present invention (in which insulated core wires 8 that are thicker than the twisted-pair wires 4 are disposed along both sides of the twisted-pair wires 4, and further, in which adhesive tape 6 is provided along both sides of the plastic tape 5 provided on the outside of the insulated core wires 8 and the twisted-pair wires 4). A chart of the construction of this embodiment is shown in TABLE 1 below. In the case of this embodiment, as is clear from TABLE 1, although the thickness of the flat cable part is approximately 1 mm and shows preferable results, it is acceptable if the permissible range is approximately 2 mm. In addition, the thickness of the portion where the adhesive material is applied along both edges (including the two plies of tape) is approximately 1.5 mm.

TABLE 1

Construction chart of the thin flat twisted-pair gap cable 1D according to a fourth embodiment of the present invention.

| Item | | Specification Example | | Remarks |
|---|---|---|---|---|
| Conductor | Type | Tin-plated copper wire | | |
| | Outside diameter | | 0.2 mm | |
| Insulator | Type | Polyethylene | | |
| | Outer diameter | App. | 0.3 mm | |
| Pair | Number of pairs | 4 pairs | | |
| Laminate tape 1 | Type | Polyester tape | | |
| | Color | White | | |
| | Thickness | App. | 0.2 mm | |
| Laminate tape 2 | Type | Polyester tape | | |
| | Color | White | | |
| | Thickness | App. | 0.05 mm | |
| Flat cable | Width | App. | 14 mm | |
| | Height | App. | 1.0 mm | |
| | Height | App. | 1.5 mm | Including adhesive tape |

Next, the thin flat twisted-pair gap cable ID of the fourth embodiment of the present invention is actually stuck to the aluminum sash of a window and an installation test (1), an insertion test (2) and an impact test (3) carried out.

A summary chart of the tabulated results is shown in TABLE 2 below.

TABLE 2

Chart of evaluation test results of the thin flat twisted-pair gap cable ID of the fourth embodiment of the present invention.

| NO | Evaluation Test Item | Evaluation Method | Evaluation Results | | |
|---|---|---|---|---|---|
| | | | Continuity | Withstand Voltage | Transmission Performance |
| 1 | Installation Test (1) | Stuck to aluminum window sash. Installation test | Good | At 500 V DC applied for 1 min. No problem | Meets Cat5 performance standards (frequency characteristics shown in FIG. 3) |
| 2 | Insertion Test (2) | Stuck to aluminum window sash, window opened and closed 10,000 times. Insertion test | Good | At 500 V DC applied for 1 min. No problem | Meets Cat5 performance standards (frequency characteristics shown in FIG. 4) |
| 3 | Impact Test (3) | Dropped 2 mm-wide, 3 kgf weight on cable of first embodiment 7,000 times. Impact test | Good | At 500 V DC applied for 1 min. No problem | Meets Cat5 performance standards (frequency characteristics shown in FIG. 5) |

Figure 3:
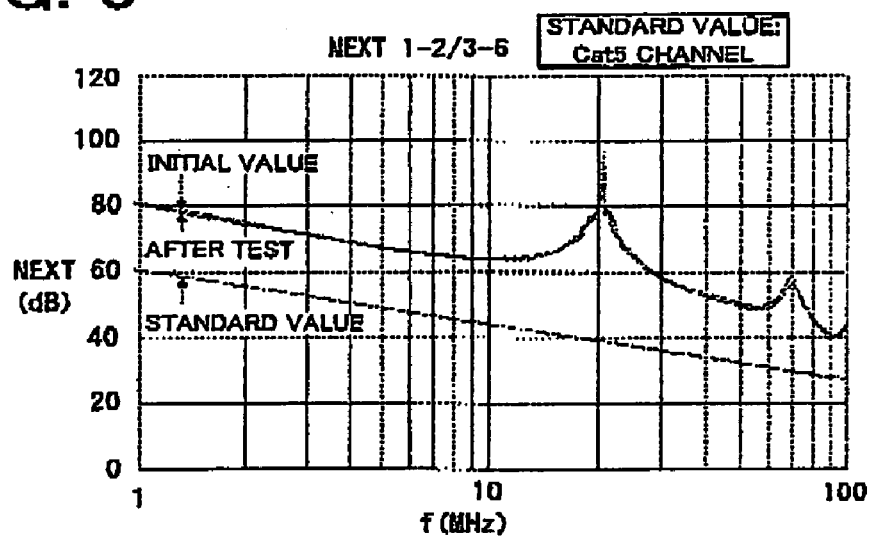
FIG. 3 is a graph showing Near End Cross Talk (NEXT) performance evaluation test results from a first construction test.

Near End Cross Talk (NEXT) performance evaluation test results (1) for the first installation test conducted using the cable of the present invention are shown in the appended FIG. 3.

Figure 4:
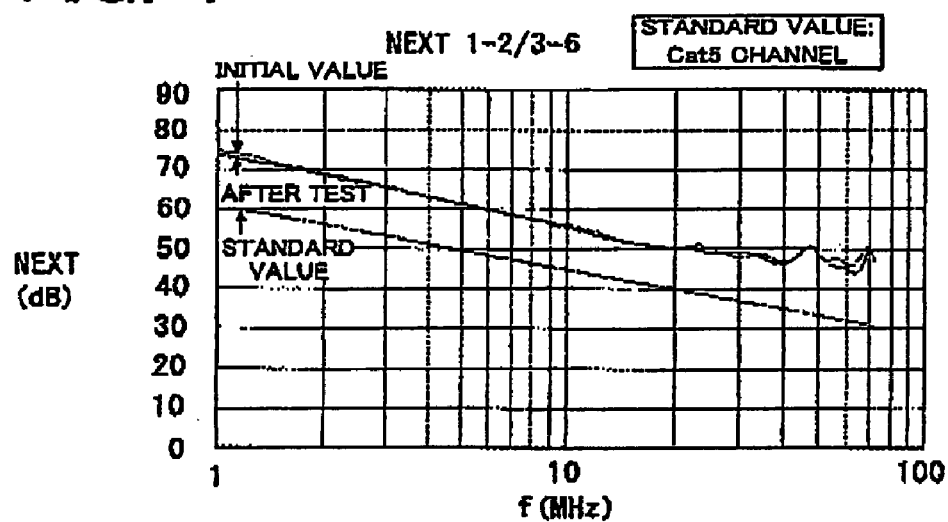
FIG. 4 is a graph showing Near End Cross Talk (NEXT) performance evaluation test results from a second insertion test.
Figure 5:
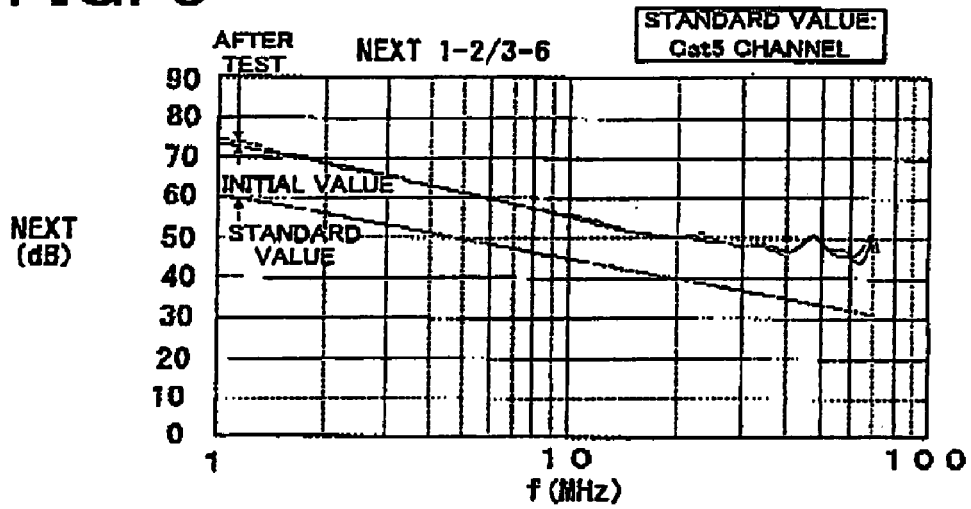
FIG. 5 is a graph showing Near End Cross Talk (NEXT) performance evaluation test results from a third impact test.

Near End Cross Talk (NEXT) performance evaluation test results (2) for the second insertion test conducted using the cable of the present invention are shown in appended FIG. 4.

Near End Cross Talk. (NEXT) performance evaluation test results (3) for the third impact insertion test conducted using the cable of the present invention are shown in appended FIG. 5.

From the evaluation test results of any of the foregoing TABLES 3, 4 and 5, it can be understood that there is no change in any of the initial values after testing and that the present invention meets performance levels for the reference values for Near End Cross Talk.

Furthermore, evaluation tests of electrical tests other than Near End Cross Talk were carried out and the tabulated results shown in TABLE 3 below.

TABLE 3

Electrical performance test results for the thin flat twisted-pair gap cable 1D of the fourth embodiment of the present invention.

Electrical Performance Tests

| Item | Unit | Rated Value | | Measured Value |
|---|---|---|---|---|
| Conductor Resistance | Ω/100 m | 9.38 | DC | 57* |
| Structural Return Loss | dB | 23 | $f = 1–20$ MHz | Margin 7 |
| Return Loss | dB | $16 - 10 \log(f/100)$ | $f = 20–100$ MHz | Margin 4 |
| | | $17 + 3 \log(f)$ | $f = 1–10$ MHz | |
| | | 20 | $f = 10–20$ MHz | |
| | | $20 - 7 \log(f/20)$ | $f = 20–100$ MHz | |
| Insertion Loss | dB/100 m | $1.967 * \text{sqrt}(f) + 0.023 * (f) + 0.05/\text{sqrt}(f)$ | $f = 1–100$ MHz | Margin 33* |
| Near End Cross Talk | dB | $32.3 - 15 \log(f/100)$ | $f = 1–100$ MHz | Margin 7 |
| Equal Level Far End Cross Talk | dB/100 m | $20.8 - 20 \log(f/100)$ | $f = 1–100$ MHz | Margin 9 |
| Propagation Delay | ns/100 m | $534 + 36/\text{sqrt}(f)$ | $f = 1–100$ MHz | Margin 55 |
| Delay Skew | ns/100 m | 45 | $f = 1–100$ MHz | Margin 20 |

Margin: The frequency (f) is varied from 1M to 100 MHz and the point at which the margin for the standard value is smallest is the margin value.
*The measured value is greater than the standard value because the standard value is for AWG24 solid conductor.

From these results, it can be understood that the present invention conforms to all electrical performance standards starting with Near End Cross Talk and meets performance requirements.

As can be understood by those of ordinary skill in the art, although up to this point the invention has been described in terms of installation in a window sash, using an adapter, and so forth, the present invention can be adapted to a wide variety of applications, with or without slight variation, and such variation or modification is within the scope of the present invention.

What is claimed is:

1. A thin flat twisted-pair gap cable, comprising:
    small-diameter conductors each having an outer diameter not greater than 0.4 mm;
    twisted-pair wires, each formed by twisting two core wires respectively constituted of said small-diameter conductors covered by insulating covering having thickness not greater than 0.8 mm, said twisted-pair wires being aligned side by side; and two plies of plastic tape having inside surfaces coated with thermoplastic adhesive and fused together such that said twisted-pair wires are aligned side by side between said two plies of plastic tape in the middle portion of a tape width-wise, to form the thin flat twisted-pair gap cable having a thickness not greater than 2 mm;

wherein a thickness of one of said two plies of plastic tape is not greater than 5 μm, and a thickness of the other of said two plies of plastic tape is 100–200 μm.

2. The thin flat twisted-pair gap cable according to claim 1, wherein ultraviolet ray-proof particles are added to the plastic tape to protect said twisted-pair wires from ultraviolet rays.

3. The thin flat twisted-pair gap cable according to claim 1, wherein the cable conforms to LAN cable electrical performance standards.

4. A thin flat twisted-pair gap cable, comprising:

small-diameter conductors each having an outer diameter not greater than 0.4 mm;

twisted-pair wires, each formed by twisting two core wires respectively constituted of said small-diameter conductors covered by insulating covering having thickness not greater than 0.8 mm, said twisted-pair wires being aligned side by side;

two plies of plastic tape having inside surfaces coated with thermoplastic adhesive and fused together such that said twisted-pair wires are aligned side by side between said two plies of plastic tape in the middle portion of a tape width-wise, to form the thin flat twisted-pair gap cable having a thickness not greater than 2 mm; and adhesive tape stuck along both edges of said two plies of plastic tape, the adhesive tape having a thickness equal to or greater than a convex part of the center of the cable into which the twisted-pair wires are inserted so as to protect the twisted-pair wires from the pressure of opening and closing of a window.

5. The thin flat twisted-pair gap cable according to claim 4, further comprising either a spacer or a core wire aligned parallel to said twisted-pair wires and having an outer diameter thicker than an outer diameter of the twisted-pair wires in the plastic tape so as to protect said twisted-pair wires from pressure exerted from outside.

6. A gap navigator unit comprising:

a thin flat twisted-pair gap cable; and either a modular rosette or a modular plug stuck along both edges of the thin flat twisted-pair gap cable;

said thin flat twisted-pair gap cable comprising:

small-diameter conductors each having an outer diameter not greater than 0.4 mm, twisted-pair wires, each formed by twisting two core wires respectively constituted of said small-diameter conductors covered by insulating covering having thickness not greater than 0.8 mm, said twisted-pair wires being aligned side by side, and two plies of plastic tape having inside surfaces coated with thermoplastic adhesive and fused together such that said twisted-pair wires are aligned side by side between said two plies of plastic tape in the middle portion of a tape width-wise, to form the thin flat twisted-pair gap cable having a thickness not greater than 2 mm;

wherein said modular rosette has a built-in pulse transformer to protect a device to be connected.

7. The gap navigator unit according to claim 6, wherein said flat twisted-pair cable is connectable with said modular rosette to extend laterally as well as upwardly.

8. The gap navigator unit according to claim 6, wherein said thin flat twisted-pair gap cable further comprises an adapter for connecting to an ordinary round cable.

9. A gap navigator unit comprising:

a thin flat twisted-pair gap cable; and either a modular rosette or a modular plug stuck along both edges of the thin flat twisted-pair gap cable;

said thin flat twisted-pair gap cable comprising:

small-diameter conductors each having an outer diameter not greater than 0.4 mm, twisted-pair wires, each formed by twisting two core wires respectively constituted of said small-diameter conductors covered by insulating covering having thickness not greater than 0.8 mm, said twisted-pair wires being aligned side by side, and two plies of plastic tape having inside surfaces coated with thermoplastic adhesive and fused together such that said twisted-pair wires are aligned side by side between said two plies of plastic tape in the middle portion of a tape width-wise, to form the thin flat twisted-pair gap cable having a thickness not greater than 2 mm;

wherein a thickness of one of said two plies of plastic tape is not greater than 50μm, and a thickness of the other of said two plies of plastic tape is 100–200μm.

10. The gap navigator unit according to claim 9, wherein said modular rosette has a built-in pulse transformer to protect a device to be connected.

11. The gap navigator unit according to claim 10, wherein said flat twisted-pair cable is connectable with said modular rosette to extend laterally as well as upwardly.

12. The gap navigator unit according to claim 10, wherein said thin flat twisted-pair gap cable further comprises an adapter for connecting to an ordinary round cable.

13. A gap navigator unit comprising:

a thin flat twisted-pair gap cable; and either a modular rosette or a modular plug stuck along both edges of the thin flat twisted-pair gap cable;

said thin flat twisted-pair gap cable comprising:

small-diameter conductors each having an outer diameter not greater than 0.4 mm, twisted-pair wires, each formed by twisting two core wires respectively constituted of said small-diameter conductors covered by insulating covering having thickness not greater than 0.8 mm, said twisted-pair wires being aligned side by side, two plies of plastic tape having inside surfaces coated with thermoplastic adhesive and fused together such that said twisted-pair wires are aligned side by side between said two plies of plastic tape in the middle portion of a tape width-wise, to form the thin flat twisted-pair gap cable having a thickness not greater than 2 mm, and adhesive tape stuck along both edges of said two plies of plastic tape, the adhesive tape having a thickness equal to or greater than a convex part of the center of the cable into which the twisted-pair wires are inserted so as to protect the twisted-pair wires from the pressure of opening and closing of a window.

14. The gap navigator unit according to claim 13, wherein said modular rosette has a built-in pulse transformer to protect a device to be connected.

15. The gap navigator unit according to claim 13, wherein said flat twisted-pair cable is connectable with said modular rosette to extend laterally as well as upwardly.

16. The gap navigator unit according to claim 13, wherein said thin flat twisted-pair gap cable further comprises an adapter for connecting to an ordinary round cable.

17. The gap navigator unit according to claim 13, further comprising
 either a spacer or a core wire aligned parallel to said twisted-pair wires and having an outer diameter thicker than an outer diameter of the twisted-pair wires in the plastic tape so as to protect said twisted-pair wires from pressure exerted from outside.

18. The gap navigator unit according to claim 17, wherein said flat twisted-pair cable is connectable with said modular rosette to extend laterally as well as upwardly.

19. The gap navigator unit according to claim 17, wherein said thin flat twisted-pair gap cable further comprises an adapter for connecting to an ordinary round cable.

20. A gap navigator unit comprising:
 a thin flat twisted-pair gap cable; and
 either a modular rosette or a modular plug stuck along both edges of the thin flat twisted-pair gap cable;
 said thin flat twisted-pair gap cable comprising:
  small-diameter conductors each having an outer diameter not greater than 0.4 mm,
  twisted-pair wires, each formed by twisting two core wires respectively constituted of said small-diameter conductors covered by insulating covering having thickness not greater than 0.8 mm, said twisted-pair wires being aligned side by side,
 two plies of plastic tape having inside surfaces coated with thermoplastic adhesive and fused together such that said twisted-pair wires are aligned side by side between said two plies of plastic tape in the middle portion of a tape width-wise, to form the thin flat twisted-pair gap cable having a thickness not greater than 2 mm, and
 either a spacer or a core wire aligned parallel to said twisted-pair wires and having an outer diameter thicker than an outer diameter of the twisted-pair wires in the plastic tape so as to protect said twisted-pair wires from pressure exerted from outside,
wherein an inner surface of one of the plies of plastic tape contacts a circumference of the spacer or core wire and circumferences of each of the twisted-pair wires, and an inner surface of the remaining ply of plastic tape contacts the circumference of the spacer or core wire and the circumferences of less than an entirety of the twisted-pair wires; and
wherein said modular rosette has a built-in pulse transformer to protect a device to be connected.

* * * * *

UNITED STATES PATENT AND TRADEMARK OFFICE
CERTIFICATE OF CORRECTION

PATENT NO. : 7,161,085 B2 Page 1 of 1
APPLICATION NO. : 11/170078
DATED : January 9, 2007
INVENTOR(S) : Keiichiro Sugimoto et al.

It is certified that error appears in the above-identified patent and that said Letters Patent is hereby corrected as shown below:

Column 6, Line 66, change "thickness" to --an outer diameter--.

Column 7, Line 9, change "5μm," to --50 μm,--.

Column 7, Line 24, change "thickness" to --an outer diameter--.

Column 7, Line 56, change "thickness" to --an outer diameter--.

Column 8, Line 17, change "thickness" to --an outer diameter--.

Column 8, Line 48, change "thickness" to --an outer diameter--.

Column 10, Line 2, change "thickness" to --an outer diameter--.

Signed and Sealed this

Fourteenth Day of October, 2008

JON W. DUDAS
*Director of the United States Patent and Trademark Office*